United States Patent [19]

Raymond et al.

[11] Patent Number: 5,049,280
[45] Date of Patent: Sep. 17, 1991

[54] 2,3-DIHYDROXYTEREPHTHALAMIDES AS HIGHLY EFFECTIVE METAL ION SEQUESTERING COMPOUNDS

[75] Inventors: Kenneth N. Raymond, Berkeley, Calif.; Thomas M. Garrett, Strasbourg, France; Peter W. Miller, Poulsbo, Wash.

[73] Assignee: The Regents of the University of California, Oakland, Calif.

[21] Appl. No.: 331,584

[22] Filed: Mar. 29, 1989

[51] Int. Cl.$^5$ ............................................. B01D 15/00
[52] U.S. Cl. .................................. 210/638; 210/639; 210/645; 210/651; 210/663; 210/687; 210/688; 426/271
[58] Field of Search ................ 210/638, 639, 644–646, 210/650, 651, 681, 684, 687, 688, 663; 426/271

[56] References Cited

U.S. PATENT DOCUMENTS 3,755,161  8/1973  Yokota et al. ....................... 210/679
4,758,351  7/1988  Kern .................................... 426/271

Primary Examiner—Ivars Cintins
Attorney, Agent, or Firm—Phillips, Moore, Lempio & Finley

[57] ABSTRACT

The present invention relates to the use of a 2,3-dihydroxyterephthalamide of the structure (I):

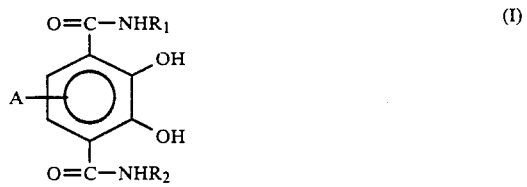

wherein
A is selected from hydrogen or an organic linking group Y attached to a solid substrate Q,
$R_1$ is independently selected from alkyl having from 1 to 20 carbon atoms, or aryl having from 6 to 14 carbon atoms, and
$R_2$ is selected from $R_1$ or an organic linking group Z bonded to a solid substrate, with the proviso that structure (I) has only one linking group selected from Y or Z to a solid substrate Q, as selective chelating or sequestering to remove at least one metal ion from aqueous solution. These dihydroxy compounds are useful to remove metal ions (e.g., $Fe^{+3}$), from industrial waste water, human or mammalian blood or plasma, and the like.

26 Claims, 7 Drawing Sheets

SPECIES DISTRIBUTION MTA

FIG._1B

FIG._5B
BASE FORM

FIG._1A

FIG._5A
ACID FORM

FIG._2A  TRENCAM, 11

FIG._2B

FIG._2C  BICAPPED TRENCAM, 13

$X = $

FIG._2D  ETHANE TRIMER, 14

2,3-DIHYDROXYTEREPHTHALAMIDES AS HIGHLY EFFECTIVE METAL ION SEQUESTERING COMPOUNDS

ORIGIN OF THE INVENTION

This invention was made with Government support under Grant Contract No. AM-32999 awarded by the National Institute of Health. The Government has certain rights in this invention.

BACKGROUND OF THE INVENTION

1. Field of the Invention

The present invention relates to the use of 2,3-dihydroxyterephthalamides as highly efficient monomeric metal ion chelating agents to sequester metal ions in aqueous solutions. More specifically, it is the use of these compounds to sequester iron ions in aqueous solutions such as mine drainage, industrial waste water, foods or human or mammalian blood or plasma.

2. Description of Related Art

Figure 1A:
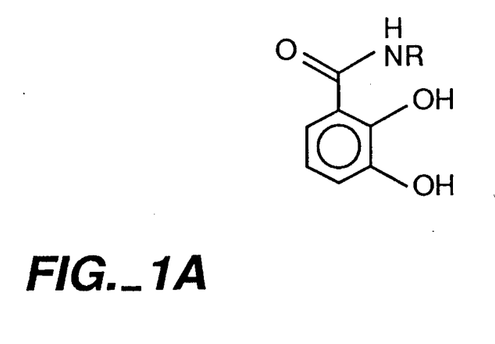
FIGS. 1A and 1B show bidentate binding subunits used in catechoylamide (A) and 2,3-dihydroxyterephthalamide (B) Fe(III) sequestering agents.
Figure 1B:
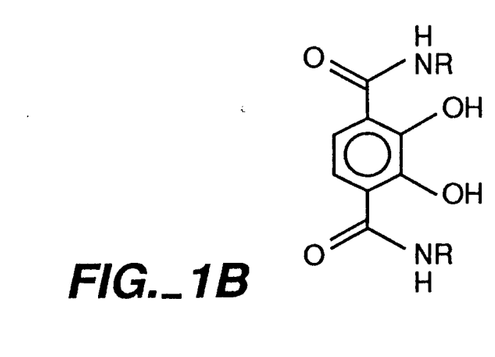
Figure 2A:
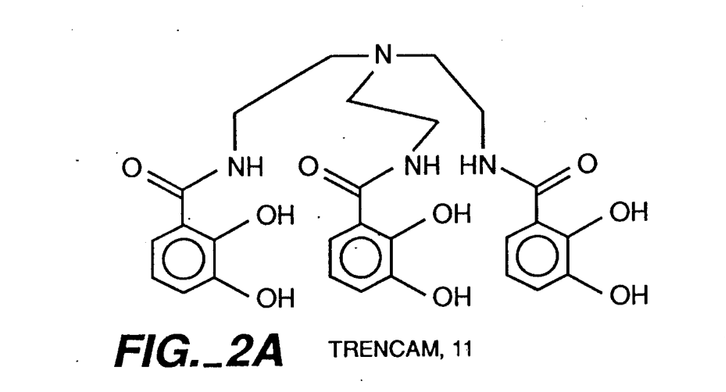
FIGS. 2A-2D shows recently synthesized catechoylamide Fe(III) sequestering agent.
Figure 2B:
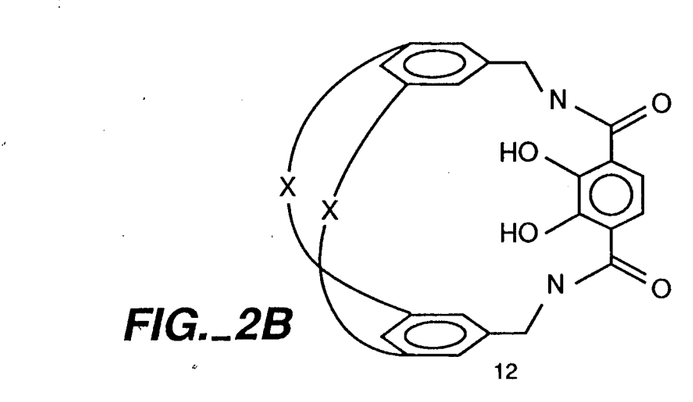
Figure 2C:
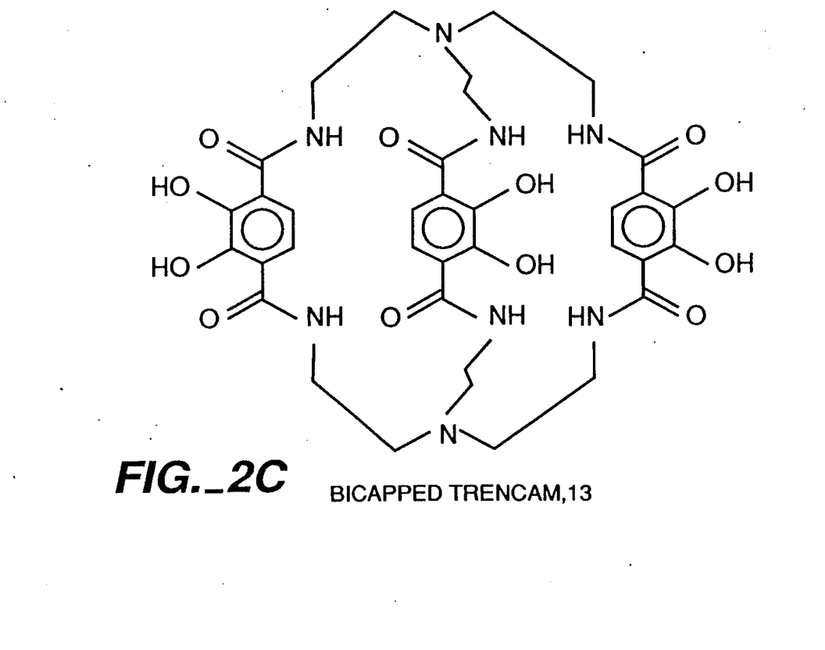
Figure 2D:
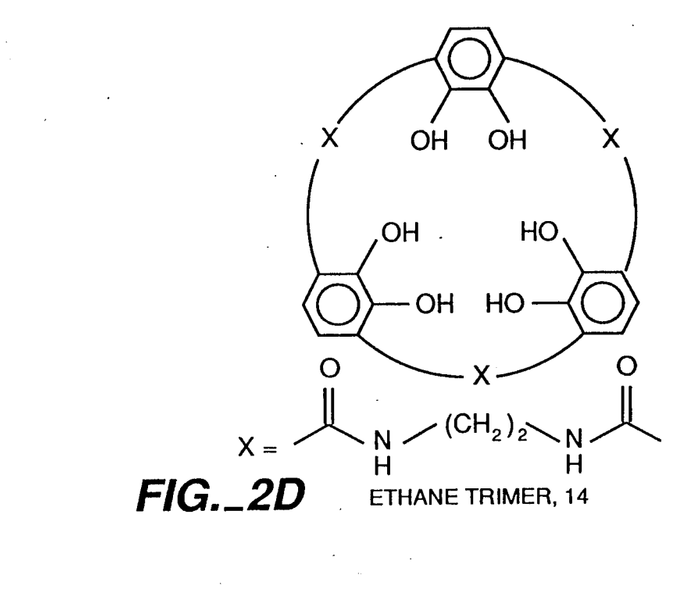

The most powerful of the siderophores is enterobactin (log $K_f$ equal to about 52, see W. R. Harris, et al. (1979) below) which contains three 2,3 dihydroxy-benzamide binding subunits (such as subunit type A in FIG. 1) which is pendant from a tri-serine backbone.

ArtAd of interest in this chelate technology includes:

D. F. Busch, et al. (1971), *Advanced Chemical Ser.*, Vol. 100, p. 44.

D. H. Cabiness, et al., (1969), *Journal of the America Chemical Society*, Vol. 91, pp. 6540-6541.

W. R. Harris, et al. (1979), *Journal of the American Chemical Society*. Vol. 101, pp. 6097-6104.

J. -M. Lehn, (1985) Science, Vol. 227, pp. 849-856.

L. D. Loomis, (1986), Ph. D. Dissertation University of California, Berkeley, Ca.

T. J. McMurry, et al. (1987), *Journal of the American Chemical Society*, Vol. 109, pp. 3451-3453.

T. J. McMurry, et al. (1987A), *Journal of the American Chemical Society*, Vol. 109, pp. 7196-7198.

A. E. Martell, (1981), "Development of Iron Chelators for Clinical Use." New York, N.Y.: Elsevier North Holland Inc. pp. 67-104.

A. E. Martell, et al. (1976), *Critical Stability Constants*, Plenum: New York, N.Y.: Vol IV, p.1.

K. N. Raymond, et al. (1984), *Topics in Current Chemistry*, Vol. 123, pp. 50-102.

S. J. Rogers, et al. (1985), *Journal of the American Chemical Society*, Vol. 107 pp. 4094-4095.

K. N. Raymond, et al. (1988), *Pure and Applied Chemistry*, Vol. 60, No. 4, pp. 545-548.

R. C. Scarrow, (1985), Ph.D. Dissertation University of California at Berkeley.

R. C. Scarrow, et al. (1988), *Inorganic Chemistry*, Vol. 27, pp. 4140-4149.

H. Stunzi, et al. (1979), *Australian Journal of Chemistry*, Vol. 32, pp. 21-30.

H. Stunzi, et al. (1980), *Australian Journal of Chemistry*, Vol. 33, pp. 2207-2220.

P. Statte, et al. (1987). *Tetrahedron*, Vol. 43, pp. 2065-2074.

Y. Sun, et al. (1986), *Inorganic Chemistry*, Vol. 25, p. 4780.

F. L. Weitl, et al. (1981), *Journal of Medicinal Chemistry*, Vol. 24, pp. 203-206.

K. Wolgang, et al. (1984), *Angewante Chemie International. Ed.-English*, Vol. 23, p. 714.

All of the articles, patents and references cited in this application are incorporated herein by reference.

Recently, a number of reports (e.g., K. Wolgang, et al. (1984); P. Sutte, et al., (1987); Y. Sun, et al. (1986); S. J. Rogers, et al., (1985); T. J. McMurry, et al. (1987) and (1987A)) describe the production of macrobi-cycles such as compound #12 and compound #13 and macrocycles such as compound #14 (shown in FIG. 2) which are not based on the 2, 3-dihydroxybenzamide moiety found in enterobactin. Instead these polycyclic compounds are based on the 2,3-dihydroxyterephthalamide, structure B (FIG. 1 ), as the binding subunit.

A number of reports, e.g. D. K. Cabbiness, et al. (1969); D. H. Busch, et al., (1971); J.-M. Lehn and A. E. Martell (1981), use the term "macrocyclic effect" to describe the increased stability gained by a chelating agent when all binding subunits are incorporated into a macrocycle or macrobicycle.

In a strategy toward a more effective chelating agent, the enthalpic properties of the new binding subunit have not been heretofore considered or appreciated. It is therefore useful and desirable to recognize that monomeric 2,3-dihydroxyterephthalamides have remarkably high binding constants for metal atoms in aqueous solution. The present invention accomplishes that objective.

SUMMARY OF THE INVENTION

In one aspect, the present invention relates to the use of a 2,3-dihydroxyterephthalamide of the structure (I):

wherein
A is selected from hydrogen or a linking group Y selected from alkylene, arylene, or arylalkylene, to a solid substrate Q, $R_1$ is independently selected from alkyl having from 1 to 20 carbon atoms, or aryl having from 6 to 14 carbon atoms, and

$R_2$ is independently selected from $R_1$ or an organic linking group Z selected from alkylene, arylene or aryl alkylene to a solid substrate Q, with the proviso that structure (I) has only one linking group selected from Y or Z to a solid substrate Q, as a metal ion sequestering agent. In one embodiment, $R_1$ and $R_2$ are each aryl. In one embodiment, $R_1$ and $R_2$ are independently alkyl having from 1 to 6 carbon atoms. metals.

In one embodiment, the metal ion is selected from the lanthanide metals, the actinide metals or the transition In one embodiment, the metal ion is selected from iron, copper, cobalt, nickel, magnesium, zinc, chromium, cadmium, or mixtures thereof, wherein the metal ion is in a high oxidation state.

In another aspect, the present invention relates to a process for the removal of metal ions from an aqueous solution, which process comprises:

(a) contacting the metal M ion-containing aqueous solution with a sufficient quantity of a 2,3-dihydroxyterephthalamide of the structure (I):

(I)

wherein:

A is selected from hydrogen or a linking group Y itself selected from alkylene, arylene or arylalkylene, to a solid substrate Q, $R_1$ is independently selected from alkyl having from 1 to 20 carbon atoms or aryl having from 6 to 14 carbon atoms, to form a two ligand or three ligand bidentate chelate of structure (I)· metal ion;

$R_2$ is independently selected from $R_1$ or an organic linking group Z selected from alkylene, arylene or aryl alkylene to a solid substrate Q, with the proviso that the two ligand or three ligand bidentate chelate structure will have only one linking group selected from Y or Z to a solid substrate Q, and (b) separating the chelate formed from the aqueous solution.

In one embodiment, in structure (I), A is hydrogen and $R_1$ and $R_2$ are each selected from higher alkyl or aryl such that the (two ligand or three ligand bidentate chelate) metal is substantially soluble in organic solvents, and in step (b) the two ligand or three ligand bidentate chelate metal is removed by extraction using an organic solvent which is essentially insoluble in water.

In one embodiment, A is a linking group Y to a solid substrate Q; and in step (b), the aqueous solution containing the metal ion in aqueous solution is contacted with the solid substrate which chelates the metal ion, and the aqueous solution and solid substrate are subsequently physically separated.

In one embodiment, A is hydrogen, and $R_1$ is selected from higher alkyl or aryl such that when the tridentate metal chelate in aqueous solution is contacted under suitable pressure and temperature with a porous selective membrane, the two ligand or three ligand bidentate.metal.chelate sequestering agent is selectively retained, whereas the water and species of molecular weight less than about 300 daltons is separated (e.g., by ultrafiltration, dialysis).

In a preferred emboidment, the phthalamide is used in an amount effective to reduce themetal content of aqueous solution to a level of between about $10^{-3}$ and $10^{-6}$M.

In another preferred embodiment, phthalimide of Structure (I) is used where A is hydrogen and $R_1$ and $R_2$ are each independently selected form methyl, ethyl, i-propyl or n-propyl in an amount effective to reduce the metal content in aqueous solution of to between about $10^{-3}$ and $10^{-6}$M.

BRIEF DESCRIPTION OF THE FIGURES

1=p[H+]11.057, 2=p[H+]9.700, 3=p[H+]6.302, 4=p[H+]5.663, 5=p[H+]4.965, 6=p[H+]2.971.

1=p[H+]8.160, 2=p[H+]5.856, 3=p[H+]5.316, 4=p[H+]4.193, 5=p[H+]3.946, 6=p[H+]3.610, 7=p[H+]2.228.

DETAILED DESCRIPTION OF THE INVENTION AND PREFERRED EMBODIMENTS

Definitions

As used herein:

"Alkylene" refers to alkylene group having straight, branched or cyclic structure having from 1 to 12 carbon atoms, preferably 2 to 6 carbon atoms. Usually alkylene refers to —CH$_2$—, —CH$_2$CH$_2$—, —CH$_2$—CH$_2$—CH$_2$—, and the like.

"Arylalkylene" refers to organic groups such as and the like.

"Arylene" refers to organic groups such as:

"Linking group" refers to an organic moiety Y or Z which covalently bonds the chelate with a suitable carrier Q. See linking groups described by K. Rubenstein et al., U.S. Pat. No. 3,817,837.

"Sequestering agent" refers to a group or groups of structure (I) which are used to render substantially harmless metal ions in aqueous solution. The metal ion is essentially chemically bound so that it is unavailable for further chemical reaction, precipitation, or the like.

The equilibrium constants used in the text include (a) stepwise constant $K_{rst}$ (i) for t=0:
$K_{rst}=[M_rL_s]/[M_rL_{s-1}][L]$ representing
$M_rL_{s-1}+L=M_rL_s$; (ii) for r=0:
$K_{rst}=[L_sH_t]/[L_sH_{t-1}][H]$ representing
$L_sH_{t-1}+H=L_sH_t$;

(b) cumulative constant $\beta_{rst}=[M_rL_sH_t]/[M]^r[L]^s[H]^t$.

Abbreviations and symbols used in the text include:
FT, fourier transform; DMF, N,N-dimethylformamide; EDTA, ethylenediaminetetraacetic acid;
DMB, 2,3-dihydroxy-N,N-dimethylbenzamide;
MTA, 2,3-dihydroxymethylterephthalamide, #1;
ETA, 2,3-dihydroxyethylterephthalamide, #2;
PTA, 2,3-dihydroxypropylterephthalamide, #3;
BTA, 2,3-dihydroxybutylterephthalamide, #4;
DTA, 2,3-dihydroxydecylterephthalamide, #5;
p[H+] = −log [H+];
pH = −log $a_H$; s, singlet; d, doublet; t, triple; q, quintet; m, multiplet; br, broad; $R = \{\Sigma(Y_O - Y_C)^2 / \Sigma Y_O^2\}^{\frac{1}{2}}$, Y is the dependent variable.

It is surprising in the present invention, given that addition of another electron withdrawing group onto the aromatic ring is predicted to lower significantly the catechol protonation constants, that the first solution that thermodynamic studies on the new sequestering agents have not shown a macrocyclic effect. The formation constant for the ethane trimer, #14, is 5 log units less than that of TRENCAM, #11, a tripodal ligand within three 2,3 dihydroxybenzamide binding subunits. More recently, however, P. Stutte, et al, (1987) report a formation constant of $10^{59}$ for 12, a value seven orders of magnitude higher than enterobactin. This stability constant represents a dramatic departure from results claimed herein, as well as by Y. Sun, et al. (1986). In all of these new macrocylic ligands both the ligand topology and the binding subunit are varied. Thus, it was earlier unclear what effects are dominant in the binding of iron by the new chelating agents. Knowledge of the complexation behavior of the new binding subunits individually, without any skeletal macrocyclic structure, is crucial to an understanding of the effect of ligand topology on the hexadentate chetaling agents.

SYNTHESIS

The two routes used in the synthesis of the compounds of the present are shown in Scheme 1. Route I is the more general and has been used extensively in the synthesis of catechoylamides. Route I is employed in the preparation of 2,3-dihydroxyethylterephthalamide (ETA, #2). These compounds are derivatives of gaseous amines, thus precluding the use of route II, which require a liquid amine to serve as both nucleophile and solvent. Route I proceeds in three steps from the known compound 2,3 dihydroxyterephthalic acid #6. In the first step, reaction with SOCl2 produces the acid chloride which was used without purification. The methyl protected ligands #8 and #9 are then made by reaction of #7 with aqueous solutions of methylamine or ethylamine under biphasic Schotten-Bauman conditions. Aqueous extraction of the organic phase to remove excess amine is followed by evaporation. Crystallization gives the desired products in 73–94% yield. Deprotection is afforded by reaction with BBr3 in CH2Cl2 in 48–75% yield.

Scheme 1
Synthetic Routes to the 2,3 Dihydroxyterephthalamides

Route I

Route II

Route II proceeds in one step from the previously synthesized diester #10 in 45–87% yield. The reaction is accomplished simply by reflexing #10 in neat amine. The excess amine is removed by evaporation and extraction. The product is purified by crystallization. The ligands 2,3 dihydroxypropylterephthalamide (PTA, #3), 2,3-dihydroxybutylterephthalamide (BTA, #4), and 2,3 dihydroxydecylterephthalamide (DTA, #5) are synthesized by this one-step procedure.

Also see French Patents #95,262 and #1,573,667 for additional routes to prepare the monomeric compounds of structure I where R=H.

LIGAND EQUILIBRIA

The protonation behavior of the methyl, ethyl, and propyl amine derivatives is studied by spectrophotometric methods. The methyl compound shows a $\pi \to \pi$ transition for the double deprotonated ligand at 384 nm ($\epsilon = 4800$ M$^{-1}$cm$^{-1}$) which shifts to 360 nm ($\epsilon = 4000$) for the singly protonated species and moves again to 335 nm ($\epsilon = 2700$) for the fully protonated compound. The ethyl and propyl compounds show similar behavior (Table 1). The family of spectra (e.g. FIG. 3) produced by titrations are analyzed by means of a three-component model composed of two consecutive one-proton steps.

Figure 3:
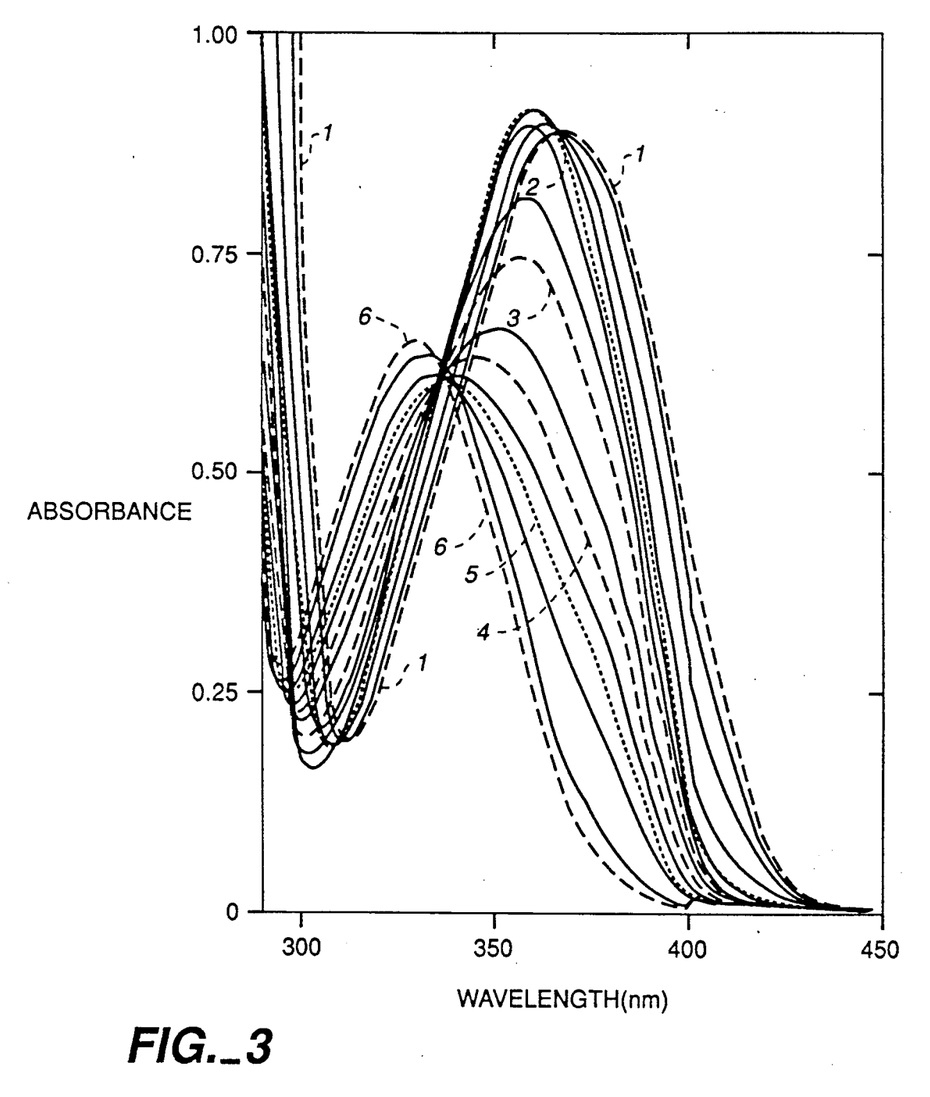
FIG. 3 shows a family of spectra generated by spectrophotometric titration of MTA 1.

(1)

Figure 4:
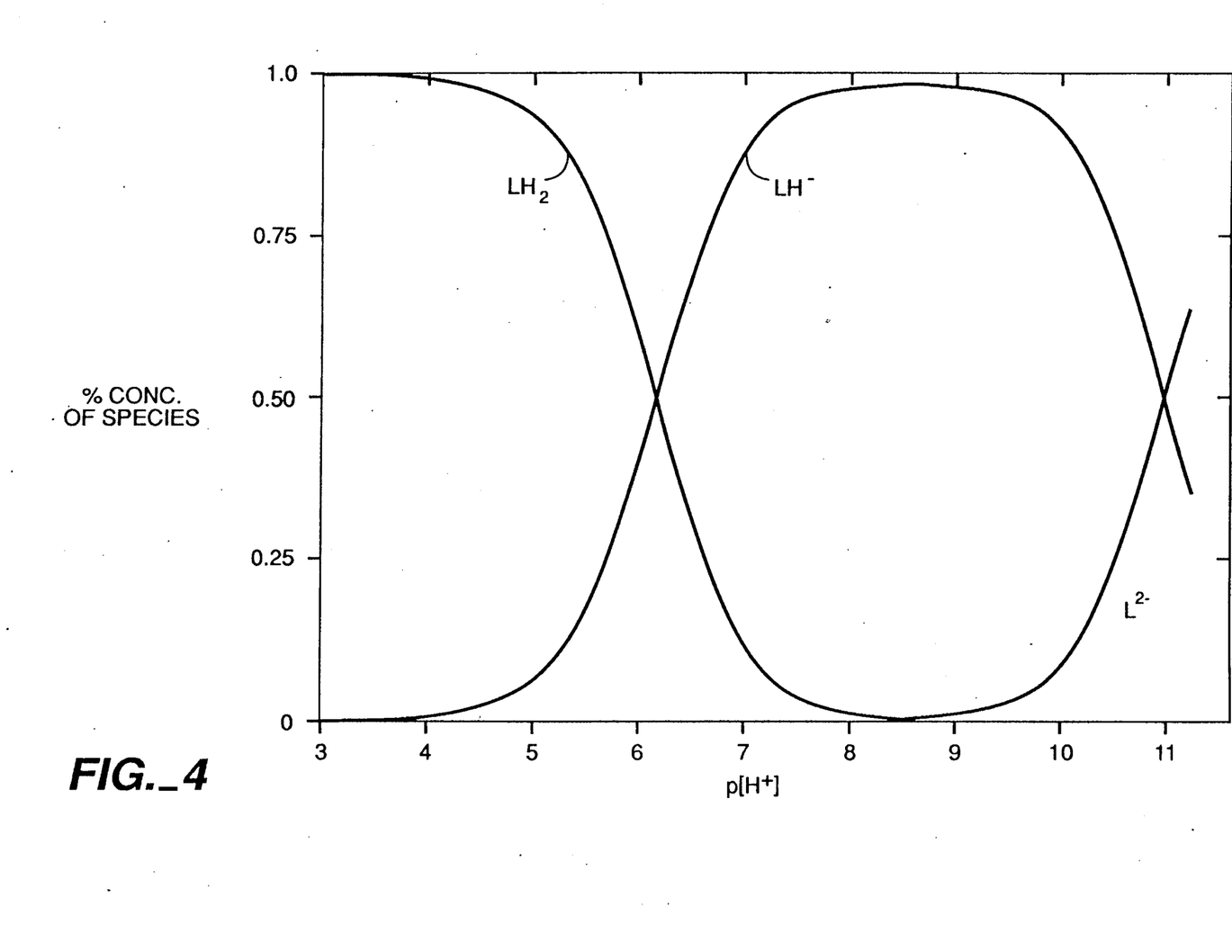
FIG. 4 shows species distribution of the MTA ligand.

Refinement results in R factors ≦1.5%. (see abbreviations). The resulting protonation constants are tabulated in Table 2 and the corresponding species distributions are shown in FIG. 4.

TABLE 2

Protonation and Formation Constants for the 2,3 Dihydroxyterephthalamides

| LIGAND | PROTONATION STATE | $\lambda_{max}$ (nm) | $\epsilon$ (M$^{-1}$cm$^{-1}$) |
|---|---|---|---|
| MTA 1 | L$^{2-}$ | 384 | 4800 |
| | HL$^-$ | 360 | 4000 |
| | H$_2$L | 335 | 2700 |
| ETA 2 | L$^{2-}$ | 384 | 4700 |
| | HL$^-$ | 360 | 3800 |
| | H$_2$L | 332 | 2600 |
| PTA 3 | L$^{2-}$ | 381 | 4700 |
| | HL$^-$ | 360 | 3800 |
| | H$_2$L | 330 | 2500 |
| BTA 4 | L$^{2-}$ | 385 | 4600 |
| | HL$^-$ | 360 | 3860 |

Figure 5A:
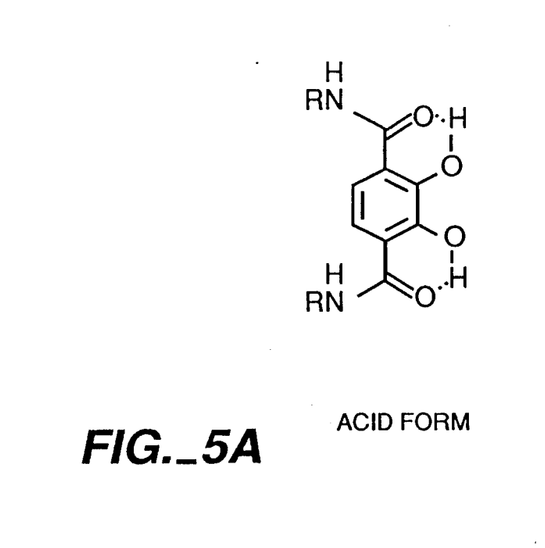
FIGS. 5A and 5B shows proposed acid and base forms of the 2,3-dihydroxyterephthalamide ligand.
Figure 5B:
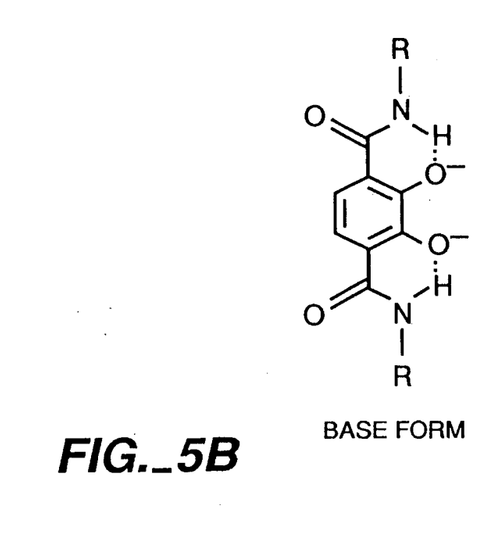

The ligand protonation constants are dramatically lower for the terephthalamides as compared to the benzamide catechol derivatives. This is expected from the more extended $\pi$ network available to the anionic charge produced upon deprotonation. In addition, the deprotonated form of the terephthalamides may be stabilized by hydrogen bonding to the amide hydrogen forming the stable six membered rings seen in FIG. 5. Recent X-ray studies have shown the presence of these hydrogen bonded forms in a ferric complex of a tris (terephthalamide)ligand. (T. J. McMurry, 1987A).

There are no significant differences between the protonation constants of the terephthalamide series. The H$_2$L form of BTA #4 precipitates at about 10 micromolar, making the detection of the second protonation constant inaccessible by the spectrophotometric method.

FERRIC COMPLEX EQUILIBRIA

The ferric complexes of the methyl, ethyl, and propyl amine derivatives are also studied by spectrophotometric methods. The tris methyl complex shows $\pi \to d$ ligand-to-metal charge transfer bands at 446 nm ($\epsilon = 5700$) and 510 nm ($\epsilon = 5400$) from pH 12 to about pH 7. From pH 7 to pH 5 there is a buffer region and from pH 5 to pH 4.4, the bis complex shows a LMCT band at 577 nm ($\epsilon = 4300$). From pH 4.4 to 3.4, there is another buffer region and then from pH 3.4 the monomeric complex shows LMCT bands at 410 nm ($\epsilon = 2000$) and 691 nm ($\epsilon = 2000$). The monomeric complex slowly disappears as the solution is titrated below pH 3.4. The ethyl and propyl amine derivatives show similar behavior (Table 3). The family of spectra generated by titration (e.g. FIG. 6) are fit with a nine component model. Three of these components are identified in the visible spectra during factor analysis componentization. These are assigned to ML, ML$_2$, and ML$_2$, related to each other by a series of two proton steps.

Figure 6:
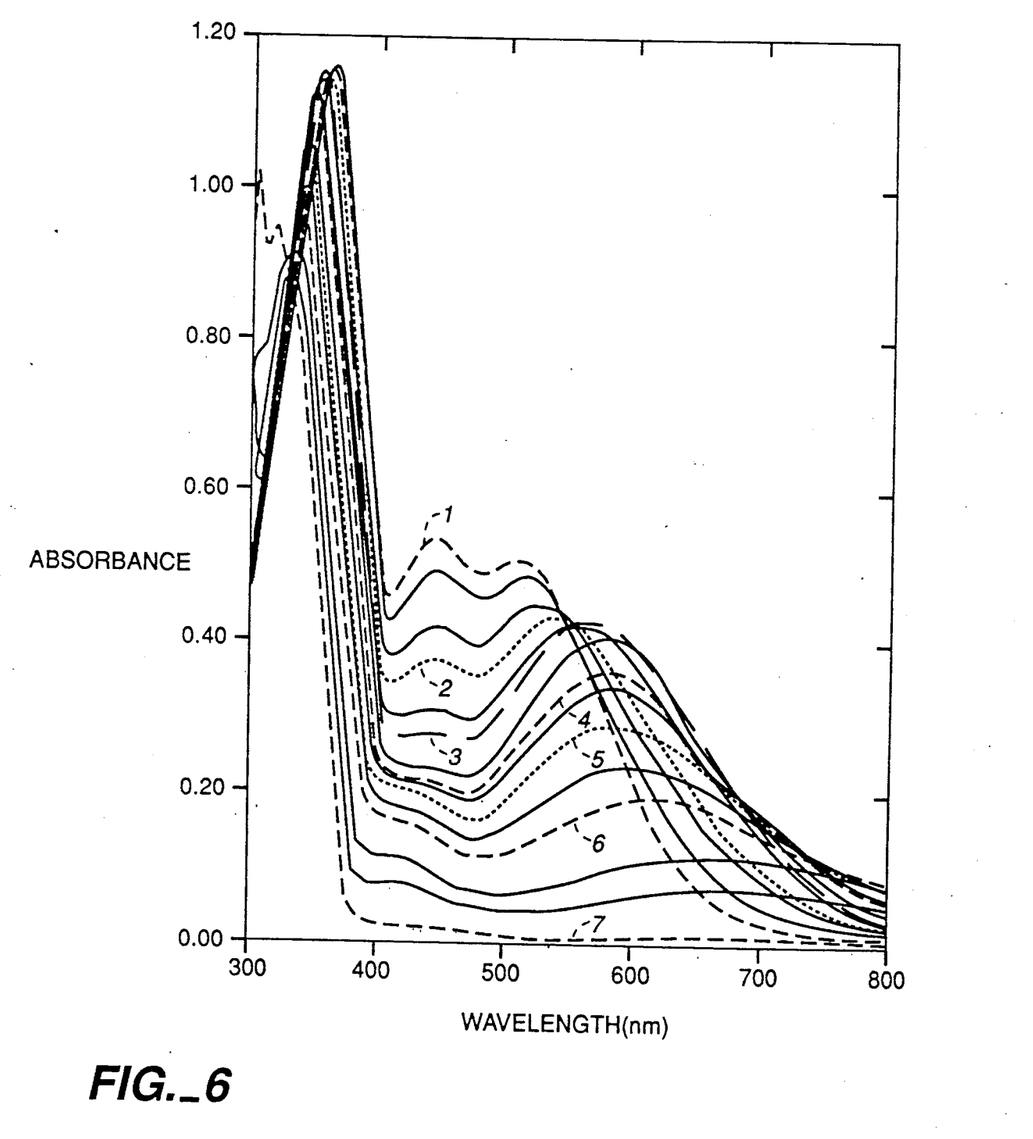
FIG. 6 is a family of spectra generated by spectrophotometric titration of Fe(MTA)$_n$.

(2)

TABLE 3

$\lambda_{max}$ and $\epsilon$ for the Ferric Complexes of the 2,3 Dihydroxyterephthalamide Ligands

| COMPLEX | $\lambda_{max}$ (nm) | $\epsilon$ (M$^{-1}$cm$^{-1}$) | $\lambda$ (nm) | $\epsilon$ (M$^{-1}$cm$^{-1}$) |
|---|---|---|---|---|
| [Fe(MTA)$_3$]$^{3-}$ | 446 | 5700 | 510 | 5400 |
| [Fe(MTA)$_2$]$^{31}$ | 577 | 4300 | | |
| [Fe(MTA)]$^+$ | 410 | 2000 | 691 | 2000 |
| [Fe(ETA)$_3$]$^{3-}$ | 448 | 5790 | 509 | 5100 |
| [Fe(ETA)$_2$]$^-$ | 577 | 3400 | | |
| [Fe(ETA)]$^+$ | 411 | 2000 | 689 | 2000 |
| [Fe(PTA)$_3$]$^{3-}$ | 448 | 5800 | 511 | 5000 |
| [Fe(PTA)$_2$]$^-$ | 577 | 3200 | | |
| [Fe(PTA)]$^+$ | 404 | 2000 | 669 | 2000 |

The other six components (assigned negligible visible absorbance in the region studied) are Fe$^{3+}$, L$^{2-}$, LH$^-$, LH$_2$, Fe(OH)$^{2+}$, and Fe(OH)$_2$$^+$. The final R factors are all ≦1.8%. The resulting stability constants are tabulated in Table 2 and the corresponding species distribution curves are shown in FIG. 7.

Figure 7A:
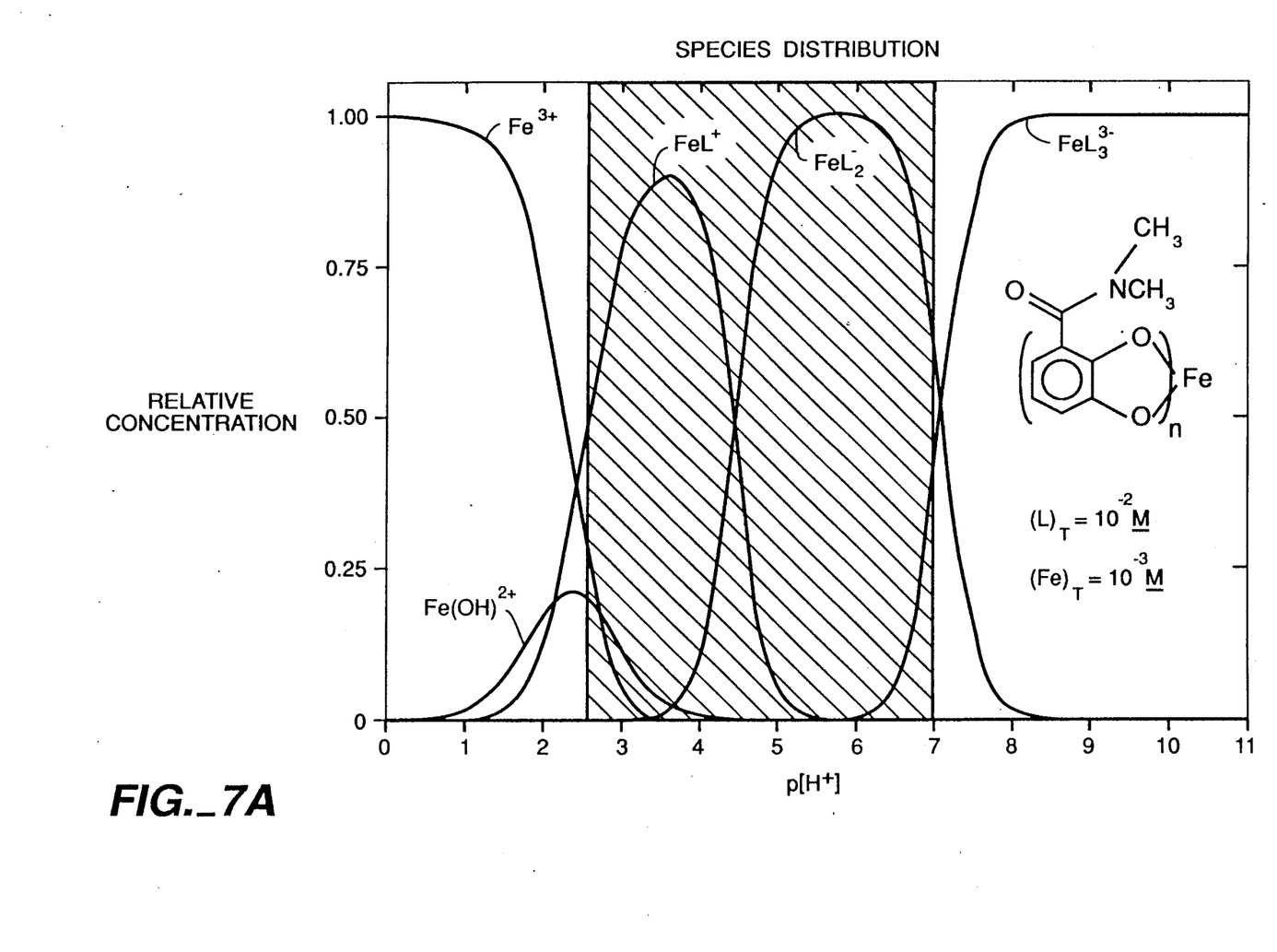
FIG. 7A and 7B show species distributions for the ferric complexes of DMB and MTA.
Figure 7B:
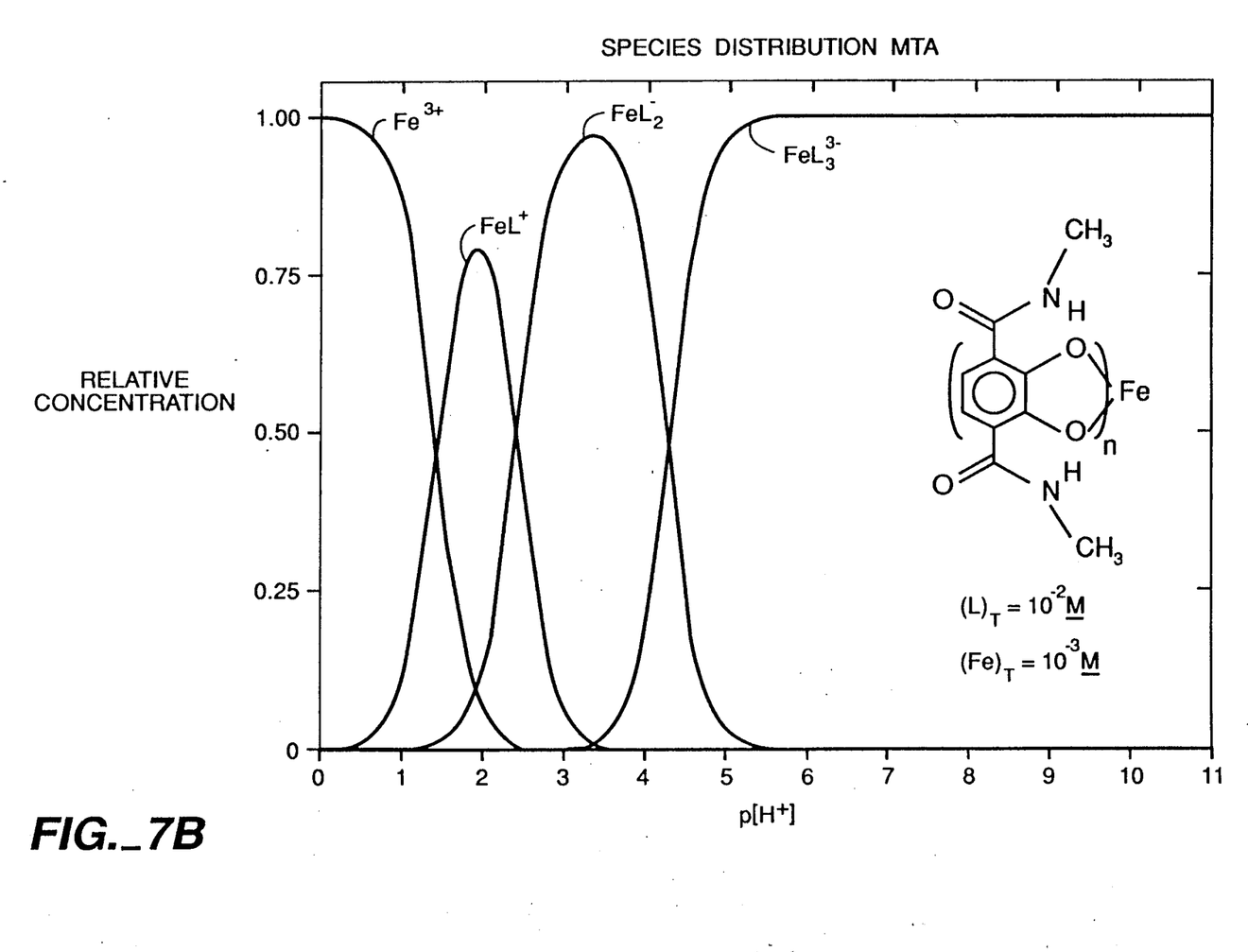

As is seen clearly in FIG. 7 these bidentate ligands demonstrate a much greater efficacy as chelating agents at pH 7.4 than do the dihydroxybenzamides. Under comparable conditions ([L]$_T$=10$^{-2}$M, [M]$_T$=10$^{-3}$M), MTA, the least powerful of the three ligands studied, remains as the FeL$_3$$^{3-}$ complex until below pH 5 while, in contrast, the FeL$_3$$^{3-}$ complex of DMB, #15, begins to disassociate below pH 8. In fact, DMB is effectively demetallated below pH 7 due to precipitation of Fe(OH)$_3$. The pH must be lowered below 1.5 to achieve greater than 50% demetallation of MTA. These results are a direct consequence of the lower ligand protonation constants coupled with a novel increase in the overall stability constant, $\beta_{130}$, for the terephthalamide ligands (see Definitions above).

For any weak acid ligand, as protonation constants decrease, the concentration of the free ligand species necessary for metal binding at pH 7.4 increases, producing a more effective sequestering agents at lower pH. Normally, the decrease in protonation constant is accompanied by a decrease in metal ligand binding constant. This effect is seen here in the lower K$_{110}$'s for the terephthalamides versus DMB.

In addition, there is normally a steady decrease in the stepwise formation constants as ligands are bound sequentially, such that K$_{110}$>K$_{120}$>K$_{130}$. The two major contributions to this are:

1) The decrease in the metal ion acidity that occurs as ligands complex the ion sequentially; and

2) The accumulation of charge on the complex as negatively charged ligands are brought together in the complex However, although the $K_{110}$ values are decreased relative to DMB, the $K_{120}$ and $K_{130}$ values are higher for the terephthalamide ligands. For the DMB complex (Table 2) the average difference in log K for the sequential formation constants is 4.6 while for the methyl terephthalate ligand it is only 2.8. These differences correspond to free energy differences in sequential catechol ligand binding of 6.2 and 3.8 kcal/mol, respectively. In other words, while the first ligand group of the terephthalate ligands bind more weakly than the benzamide ligands, there is less of a decrease in stepwise formation constants for the subsequent ligands. We explain this by noting that in the terephthalamide ligands the increased $\pi$ network can to some degree delocalize this charge relatively more than can the benzamides, resulting in a smaller decrease in each sequential stepwise formation constant. Thus, the equilibrium constant for the reaction (3):

$$ML_2^- + L^{2-} \rightleftharpoons ML_3^{3-} \quad (3)$$

is greater for L=1,2, and 3 than for L=DMB (15). This surprisingly novel result of increased ligand acidity coupled with an increased formation constant is reflected in the higher pM values of the terephthalamides. [The pM is a direct thermodynamic measurement of a ligand's ability to bind the metal at a given pH]. The pM values for the terephthalamides are the highest yet known for any bidentate ligand, up to eight orders to magnitude higher than DMB.

Within the terephthalamide series the $K_{130}$'s increase as the ligands become more lipophilic. This trend is ascribed as being due to the desolvation energy of the ligands. For the two equilibria where L and L' have the same protonation constants and both $ML_3^{3-}$ and $ML'_3^{3-}$ are very soluble species the equilibrium constant is larger for the least hydrophilic of L and L' since that system has has more desolvation energy to gain by forming the complex.

The trend of $K_{110}$ decreasing with increasing ligand lipophilicity as due to the desolvation energy of the complex. For the two equilibria of equations (6) and (7):

where again L and L' have the same protonation constants. However, now the complexed species $ML^+$ is less soluble than the reactants, and the $K_{eq}$ is larger for the system with the most hydrophilic of L and L' because that system will form a relatively more soluble $ML^+$ complex, gaining more desolation energy by complexation than the other system.

The butyl derivative again behaves much differently from the methyl, ethyl, and propyl cases. As the acid is added to a high pH solution of the ferric complex a precipitate immediately develops, therefore, it is not possible to ascertain the specific equilibrium constants for the ferric complex of BTA.

Below is shown in Table 1 the protonation constants, formation constants, and pH values for binding subunits derived from catechol.

TABLE 1

$\lambda_{max}$ and $\epsilon$ for the 2,3 Dihydroxyterephthalamide Ligands

|  | 1 | 2 | 3 | 4 |
|---|---|---|---|---|
| log $K_{110}$ | 17.8 | 16.4(1) | 16.3(1) | (16.0)* | — |
| log $K_{120}$ | 13.9 | 14.5(1) | 14.4(1) | 15.2(1) | — |
| log $K_{130}$ | 8.5 | 10.9(1) | 11.5(1) | 11.9(1) | — |
| log $\beta_{130}$ | 40.2 | 41.8 | 42.2(1) | 43.1(1) | — |
| pM | 15.0 | 21.1 | 21.6 | 22.7 | — |
| log $K_{011}$ | (12.1)* | 11.1(1) | 11.1(1) | 11.0(1) | 11.0(1) |
| log $K_{012}$ | 8.42 | 6.1(1) | 6.0(1) | 6.0(1) | — | pM = $-\log[Fe]$ at pH 7.4, $[L]_T = 10^{-5}$ M, $[Fe]_T = 10^{-6}$ M.
*Estimate.

The 2,3-dihydroxyterephthalamide ligands of the present invention form surprisingly stable complexes for such relatively simple bidentate ligands. Their greater acidity relative to the 2,3-dihydroxybenzamide unit (as found in enterobactin and other naturally-occurring ferric ion chelting agents) is determined. However, the surprising novel charge delocalization of these ligands slows the usual decrease in stepwise formation constants and strongly promotes the formation of the fully formed FeL$_3$ complex. This situation results in the highest pM ever reported in a bidentate ligand (22.7 vs 15 for DMB or 20.0 for mimosine, as reported by H. Stunzu, et al. (1979)), making these ligands the most effective bidentate iron(III) chelating agents known. These binding subunits are excellent metal (e.g. iron) chelators, even before incorporation into a macrocylic or macrobicyclic structure.

The dibutyl terephthalamide has been found to be insoluble in aqueous solution as the metal ion tris complex. This property is useful to separate the solid which precipitates from the aqueous solution. The aqueous solution has the free metal ion concentration dramatically reduced.

Use: In one embodiment, the benzamides of structure (I) are useful in the removal of excess body (blood) metal ions [e.g., iron (III)] from a mammal, preferably a human being. A pharmaceutical composition of the benzamide is made in an amount effective to chelate iron III. The composition is ingested or injected and causes the increased excretion of Fe(III) by way of the kidneys or feces. This composition is also useful for the removal of other metal ions, e.g., or thorium (IV), plutonium (IV) from a human being (or UO$_2$ II as an extractant).

The carrier can be organic (polymer, protein and the like) or inorganic (silica gel and the like). See I.W. DeVoe, et al., U.S. Pat. No. 4,530,963, which is specifically incorporated herein by reference.

In another embodiment the chelate is covalently bonded to a carrier moiety, an ion exchange resin, a polymer, or the like). The carrier-metal chelate is insoluble and the aqueous solution is separated. If the carrier-metal chelate is soluble in aqueous solution, ultrafiltration or dialysis is used to separate the metal ion purified aqueous portion.

The benzamides of structure (I) are useful to remove metal ions (higher oxidation state) from aqueous solutions.

An effective amount of structure (I) is added to the aqueous solution. The pH is adjusted and usually the chelated metal ion precipitates from the aqueous solution.

Generally the amounts of structure (I) which are used to sequester or chelate the metal ions in aqueous solution is between about 1 and $10^{-6}$M. A preferred range is between about $10^{-2}$ and $10^{-4}$M.

In the removal of metal ion from aqueous solution using the chelate-linking group (Y or Z) carrier (Q) approach, the two reactants are combined. The metal ion-composition chelate is formed. The aqueous solution remaining is then separated from high molecular weight carrier Q-chelate using ultrafiltration or dialysis. In another embodiment at least two equivalents of monomeric chelate I (where A is H) is also added to the metal ion containing aqueous solution. In this manner, the sequestering or chelation of the metal ion is more complete because three moieties are involved as shown below:

Carrier Q-linking groups

Linking Groups

The chelating group (Structure I) is normally a monomeric moiety having a molecular weight of less than 500 daltons. However, in one embodiment the chelating group is covalently bonded to a higher molecular weight carrier Q using a linking group, —Y or —Z. The functional group on the chelant is selected from amino, hydroxy, —CH$_2$CH$_2$OH, —CH$_2$NH$_2$, —COOH, —CH$_2$COOH, —SH and the like.

In those instances where a linking group Y or Z is used for bonding the chelate to a carrier Q, there are from 0 to 20 atoms in the linking group, preferably from about 1 to 10 atoms. A direct bond of the chelate to the carrier Q is also possible.

In one embodiment, the carrier Q is an ion exchange resin (having —NH$_2$, —COOH, —SO$_3$H, or —OH functionality). The carrier is also a higher molecular weight polymer (water soluble or water insoluble) having a molecular weight of about 500 to 1,000,000 daltons. When the carrier has a free amino, hydroxyl, or mercapto groups or equivalent functional group and the chelate has a free amino, hydroxy or mercapto group, the linking group Y is selected from —(CH$_2$)$_n$—, —(C=O)—, —(C=O)—(CH$_2$)$_n$—, —(C=S)—, —(C=O)—(CH$_2$)$_n$—(C=O)—, —(C=O)-NH—CH$_2$—(C=O)—, —(C=O), —(CH$_2$)$_n$, —(C=S)—, and the like, where n is an integer from 1 to 20, preferably between 2 and 10. These linking groups and the methods to obtain appropriate covalent bonding is described by K. E. Rubenstein, et al. in U.S. Pat. No. 3,817,837, which is specifically incorporated herein by reference.

Chemical procedures for connecting a chelant to a polymer backbone are also disclosed in R. Grinstead, U.S. Pat. Nos. 4,708,854 and 4,778,664, which are also incorporated herein by reference.

In another embodiment, the chelate group is covalently linked to a modified polystyrene. The polystyrene obtained from commercial sources (e.g. Dow Chemical Co., Midland, Mich. 48640) as the chloromethyl derivative (see U.S. Pat. No. 4,708,854), or is chloromethylated predominately in the 4 positions using anhydrous hydrogen chloride and formaldehyde. A ring substituted amine derivative of structure I:

is contacted with the chloromethyl polystyrene creating a covalent bond. The structure is then:

polystyrene-linking group-chelate. By adapting the procedures described in U.S. Pat. No. 4,708,854 both water insoluble and water soluble chelate-carriers are produced.

In another embodiment, the chelate group is covalently linked to a modified polystyrene. The polystyrene obtained, or is chloromethylated predominately in the 4-position using anhydrous hydrogen chloride and formaldehyde. A chelate structure of the formula:

is then contacted with the polystyrene derivative to produce the carrier chelate structure:

By adapting the procedures described in U.S. Pat. No. 4,708,854 both water-soluble and water-insoluble chelate-carriers are produced.

In another embodiment, the chelate of structure (I) is contacted with a hydrophobic polymer, such as polyethylene or a polypropylene. The chelate binds in a non-covalent manner to the polyethylene or polypropylene. The hydrophobic interactions are of sufficient strength that the chelate-polymer is used to remove metal ions from an aqueous solution without significant removal of the chelate from the organic phase.

A modified styrene polymer is described by R. B. Merrifield, et al., in U.S. Pat. No. 3,531,258.

Utility and Administration

Administration of the compounds of this invention as pharmaceuticals can be via any of the accepted modes of administration for therapeutic agents. These methods include oral, parental, transdermal, subcutaneous and other systemic modes. The preferred method of administration is oral.

Depending on the intended mode, the composition may be in many forms, for example, solid, semi-solid, or liquid dosage forms, including tablets, time release agents, pills, capsules, suspensions, solutions and the like. The compositions will include a conventional pharmaceutical excipient and an active compound of Structure I (preferably the monomeric moieties having a molecular weight of less than 400 daltons) or the pharmaceutically acceptable salts thereof and may, in addition, include other medicinal agents, pharmaceutical agents, carriers, adjuvants, diluents, etc.

The amount of the active compound of structure I administered will, of course be dependent on the molecular weight of selected compound, the subject being treated, the subject's weight, the severity of the affliction, the manner of administration and the judgment of the prescribing physician. However, an effective dose is in the range of about 25-200 mg/kg/day, preferably about 125 mg/kg/day. For an average 70 kg human, those dosages would amount to about 1.5 to 14 g/day, or preferably less than about 9 g/day.

For solid compositions, conventional nontoxic solids include, for example, pharmaceutical grades of mannitol, lactose, starch, magnesium stearate, cellulose and the like may be used. Liquid pharmaceutically administratable compositions can be prepared by dissolving, dispersing, etc., a compound of structure (I) and optional pharmaceutical adjuvants in a excipient, such as, for example, water, gylcerol, ethanol, vegetable oil and the like to form a suspension.

Actual methods of preparing such dosage forms are known, or will be apparent to those skilled in the art; see, for example, *Remington's Pharmaceutical Sciences*, Mack Publishing Company, Easton, Pa., 15th Edition, 1975. See, for example, D. E. Green, U.S. Pat. No. 4,671,901 for examples of defoxeramine chelants for metal ions.

The following Examples are presented to be descriptive and explanatory only. They are not be construed as being limiting in any way.

General: Thionyl chloride is purified by distillation from triphenyl phosphite. All liquid amines are purified by distillation from sodium. Water is deionized, distilled, and is further purified by a Millipore cartridge system (resistivity = $18 \times 10^6$ ohms-cm). Water for titrations is also degassed and placed under an inert atmosphere. All other compounds used are reagent grade and are not further purified. Spectra are collected on: nuclear magnetic resonance (NMR), a custom built 200 MHz $FT^{14}$ spectrometer; IR, a Nicolet 5/DX FT spectrometer. Melting points are taken on Buchi apparatus and are uncorrected. Microanalyses are performed by the Analytical Services Laboratory, University of California, Berkeley. Mass spectra are recorded by the Mass Spectrometry Laboratory, University of California, Berkeley.

Titration data are collected on a custom built automatic spectrophotometric titration apparatus composed of a HP 8450 UV/vis spectrophotometer (with stirring and constant temperature apparatus for 1 cm cell), a Fisher Accument pH meter with a Corning calomel combination electrode, a Metrohm 655 Dosimat automatic buret, a custom blown water-jacketed 10 cm quartz cell, a Brinkman Lauda K-2/R constant temperature bath, and a computer equivalent to an IBM/XT. BASIC programs COYOTE (1 cm cell) and TIMBER-WOLF (10 cm cell) are used to run the apparatus (see L. D. Loomis (1986)). Data analysis is performed on an IBM-AT computer using the REFSPEC spectral componentization (see R. C. Scarrow (1985) and least-squares programs. Due to limited aqueous solubility, the ligands are added as $CH_3OH$ solutions with a calibrated Gilmont pipet to high pH aqueous solutions at 0.1M ionic strength (KCl electrolyte) held at 25° C. (resulting in less than 0.4% methanol) to give a final concentration of $2.40 \times 10^{-5}$M. The iron solution ($1.00 \times 10^{-5}$M $Fe^{3+}$ and $3.00 \times 10^{-5}$M ligand) are standardized by EDTA titration with variamine blue as an indicator, are added as weak HCL solution, also with a calibrated Gilmont pipet. The solution is titrated to low pH with 0.1M HCl. After the titration the solution is back titrated to high pH with concentrated KOH to check for hysteresis (i.e. irreversible behavior), none are found. All experiments are run under an argon atmosphere, excluding $O_2$. The electrode is calibrated in concentration units with degassed solutions of $10^{-2.30}$M HCl and $10^{-0.295}$M KOH at 0.1M ionic strength (KCl). The appropriate value of 10-13.78 for Kw used (A. E. Martel, 1976).

Polymer chemicals and reagents are obtained from commerically available sources and are purified or modified as needed. Chemical suppliers are identfed in Chemical Sources U.S.A. published annually be Directories Publications, Inc. of Boca Ratan, Fla.

Compounds #6 and #10 are prepared in four steps (37% yield) (see S. J. Rogers (1985)) and three steps (47% yield) (see F. L. Weitl (1981)) respectively, by previous methods from commercially available starting materials.

Compounds Prepared via Route 1, Scheme 1

EXAMPLE 1

2,3 DIMETHOXYTEREPHTHOYL CHLORIDE, #7

To a 250ml round bottom flask containing 30 ml benzene, 2 drops DMF, and 15 ml freshly distilled $SOCl_2$ (20.6 mmol, 15 eq) is added 3.0 g (13.3 mmol, 1 eq) 2,3-dimethoxyterephthalic acid and the mixture is heated at reflux overnight (about 20 hr.) under nitrogen. The solvent is then coevaporated three times with 15ml benzene to give an oil, and the product solidified at $-15°$ C.; yield 3.3g (95%). An infrared (IR) spectrum shows an acyl chloride stretch at 1781 cm$^{-1}$. This product is used without further purification.

EXAMPLE 2

2,3 DIHYDROXYMETHYLTEREPHTHALAMIDE (MTA), #1

(A) AMIDE FORMATION #8

To 15 ml $CH_2Cl_2$ is added 1.1 g (4.2 mmol) of acid chloride #7, and the solution is put in an addition funnel. One ml of a 40% aqueous solution (13 mmol) of $NH_2CH_3$ is added to 45 ml $H_2O$ in a 250 ml three-neck flask. The pH is maintained above 10 with 0.5M NaOH in a second addition funnel. The acid chloride solution is added slowly, the mixture is stirred vigorously with a mechanical stirrer for nine hours. The aqueous layer is extracted four times with 100ml $CH_2Cl_2$. The extract is combined with the organic layer of the reaction mixture. The solvent is evaporated to give a solid. Recrystallization is accomplished using a 1:6 ratio of $CH_2Cl_2$: hexanes. yield 0.977 g (93.5%). IR shows an amide stretch at 1640 cm$^{-1}$. $^1$H NMR14 (CDCl$_3$): δ 7.95 (s,2H), 7.85 (br s,2H), 4.00 (s,6H), 3.00 (d,6H).

Analysis: Calculated (Found) for $C_{12}H_{16}N_2O_4$: C, 57.19 (57.20); H, 6.39 (6.53); N, 11.10 (11.30%).

(B) DEPROTECTION

To 45 ml $CH_2Cl_2$ in a 250-ml three-neck flask is dissolved 0.967 g (4 mmol) of the amide #8. After the apparatus is place under $N_2$, 2.8 ml $BBr_3$ (28 mmol) are added carefully. The slurry is stirred for 24 hours. The cloudy mixture turns clear yellow upon the addition of 50 ml MeOH via an addition funnel. After three more hours of stirring, the solvent is evaporated, then heated with another 50 ml of MeOH to rolling boil. The solvent is evaporated again, and the procedure of heating with 50 ml methanol followed by evaporation is repeated 16 times; yield 0.68 g (75%), mp=224° C., EIMS parent ion at 224 m/e. Nuclear magnetic resonance: $^1$H NMR (d$_6$-DMSO): δ 8.8 (br s,2H) 7.3 (s, 2H), 2.8 (s,6H).

Analysis: Calculated (Found) for $C_{10}H_{12}N_2O_4.H_{20}$: C, 47.58 (50.01); H, 5.84 (5.51); N, 11.57 (11.64)%

EXAMPLE 3

2,3-DIHYDROXYETHYLTEREPHTHALAMIDE (ETA)

(A) AMIDE FORMATION, #9

To a 250 ml three neck round bottom flask, 30 ml of $CH_2Cl_2$, 40 ml of $H_2O$, and 0.323 ml (6.3 mmol, 2 eq) of a 70% solution of ethylamine are added. The reaction flask is cooled to 0° C. by immersion in an ice bath. To this mixture, under $N_2$, is added a solution of 1 g (3.8 mmol, 1 eq) of the acid chloride #7 in 15 ml of $CH_2Cl_2$ by dropwise addition with vigorous stirring (using a mechanical stirrer). A solution of 30 mls of 0.5M NaOH is added concurrently by another addition funnel to maintain the pH above 10. After three hours the stirring is stopped, the phases are allowed to separate, and the acqueous layers are extracted with $4 \times 25$ ml $CH_2Cl_2$, dried filtered, and evaporated until white crystals form; yield 0.55 g (73%), mp=103° C. Nuclear magnetic resonance: $^1$H NMR (CDCl$_3$): δ 8.3 (br s,2H), 7.2 (s,6H), 3.9 (s,6H), 3.25 (m,4H), 1.1 (t,6H).

Analysis: Calculated (Found) for $C_{14}H_{20}N_2O_4$: C, 59.98 (59.87); H, 7.19 (7.24); N, 9.99 (10.03)%.

(B) DEPROTECTION. #2

To 0.2 g (0.7 mmol, 1 eq) of the amide #9 in 10 ml $CH_2Cl_2$ is added 0.965 ml (10 mmol 7 eq) neat $BBr_3$. The mixture is stirred at room temperature for three hours. The solvent from the resultant yellow slurry is evaporated. The yellow residue is taken up in a minimal amount of hot MeOH and the solvent is evaporated. This process is repeated fifteen times. Upon cooling of the methanol solution following the last evaporation, white crystals form; yield 0.085 g (48%), mp=215° C., EIMS parent ion at 252 m/e. Nuclear magnetic resonance: 1H NMR (d$_6$-DMSO) δ 8.3 (s,2H), 7.3 (s,2H), 3.4 (m,4H), 1.2 (t,6H).

Analysis: Calculated (Found) for $Cl_2H_{16}N_2O_4.H_2O$: C, 53.31 (53.12); H, 6.73 (6.80); N, 10.37 (10.21) %.

Compounds Prepared via Route II, Scheme 1

EXAMPLE 4

2,3-D$^1$HYDROXYPROPYLTEREPHTHALAMIDE (PTA), #3

To 30 ml (0.4 mol, 83 eq) propylamine is added 1 g (4.4 mmol, 1 eq) of compound #10. The solution is refluxed for two days. The excess amine is removed by evaporation. The remaining solid is then extracted by $3 \times 100$ ml 0.5M HCl from a 150 ml ethyl acetate solution. Crystallization is achieved in hot ethyl acetate; yield 1.03 g (84%), mp=194° C. Nuclear magnetic resonance: $^1$H NMR (d$_6$-DMSO): δ 8.8 (s, 2H), 7.3 (s, 2H), 3.3 (m, 4H), 1.5 (q,4H), 0.9 (t,6H).

Analysis: Calculated (Found) for $C_{14}H_{20}N_2O_4$: C, 59.97 (59.74); H, 7.21 (7.10); N, 9.99 (9.96)%.

EXAMPLE 5

2,3-D¹HYDROXYBUTYLTEREPHTHALAMIDE (BTA), #4

To 30 ml (0.3 mol, 69 eq) N-butylamine is added 1.0 (4.4 mmols, 1 eq) of dimethyl 2,3-dihydroxyterephthalate (#10). The mixture is refluxed for a day and a half (about 36 hr.) The solvent of the light yellow reaction mixture is evaporated away. The solids are redissolved in ethyl acetate, and are extracted with 3×200 ml of 0.5M HCl. The organic layer is dried with sodium sulfate, and the solvent is evaporated. The product is recrystallized from ethyl acetate; yield 1.36 g (87%), mp 130° C. Nuclear magnetic resonance: $^1$H NMR (d$_6$-DMSO): δ 8.8 (5,2H), 7.3 (s,2H), 3.3 (q,4H), 1.5 (m,4H), 1.3 (m,4H), 0.9(t,6H).

Analysis: Calculated (Found) for $C_{16}H_{24}N_2O_4$: C, 62.30 (62.28); H, 7.86 (7.83); N, 9.09 (9.05)%.

EXAMPLE 6

2,3-D¹HYDROXYDECYLTEREPHTHALAMIDE (DTA), #5

To 60 ml (0.3 mol, 68 eq) decylamine is added 1 g (4.4 mmol, 1 eq) 10. The solution is refluxed for two days. Partitioning of the excess amine precludes extraction of the organic layer as a useful purification route. The amine is separated by swirling the reaction mixture and Bio-Rad AG50W-X8 100-200 mesh cationic exchange resin (H+form) together in a beaker. The resin is rinsed with THF to remove all product from the beads. The resulting filtrate is evaporated. Crystals are obtained from ethyl acetate as pure white rods; yield 0.8 grams (45%), mp=118° C. Nuclear magnetic resonance $^1$H NMR (d$_6$-DMSO): δ 7.3 (s,2H), 6.8 (t,2H), 3.4 (q,4H), 1.6 (m,8H), 1.3 (m,24H), 0.8 (t,6H).

Analysis: Calculated (Found) for $C_{28}H_{48}N_2O_4$: C, 70.53 (70.3); H, 10.17 (10.1); N, 5.88 (5.7)%.

EXAMPLE 7

(a) An 1000-ml aqueous solution containing 0.1 percent by weight of iron (III) chloride is held at ambient temperature while 0.1M of 2,3-dihydroxyethylditerephthalamide is added. After stirring for 30 min., the yellow color disappears and the level of free iron (III) is less than $10^{-6}$M.

(b) The sequestering of metal ion as described above in substep (a) is repeated except that the iron (III) is replaced by a stiochiometrically equivalent amount of aluminum (III), manganese (II), chrominum (IV), plutonium (IV), magnesium (II), calcium (II), lanthanum (III), nickel (II), or zinc (II). After stirring for 30 min., the concentration of free metal ion in solution is substantially reduced to less than $10^{-6}$M.

EXAMPLE 8

Chelate Bonded to a Carrier (a) Aromatic Ring Attachment

Polyvinylbenzylchloride (15g, equivalent to 0.1 mole of monomer units) is dissolved in methylene chloride. 5-Amino-2,3-dihydroxy-1,4-dimethylditerephthalamide (0.5 mole) are added. The solution is warmed to 40°-50° C. and stirred for 2-3 hr. The excess amine and methylene chloride are evaporated using a vacuum. The resulting polymer is washed with 200 ml of saturated brine, and the chelate-carrier is recovered and used without further purification.

(b) Attachment throuoh Phthalamide Group

Polyvinylbenzyl chloride (15g, equivalent to 0.1 mole of monomer units is dissolved in methylene chloride. An amine of the structure:

is added. The solution is warmed to 40°-50° C. and is stirred for 2-3 hr. The excess amine and methylene chloride are removed using a vacuum.

The resulting polymer is carefully washed with 100 ml of saturated brine. The chelate-carrier is recovered and used without further purification:

(c) Noncovalent Attached to a Polymer

A polypropylene bottle is contacted with a (0.1 mole) solution of 2,3-dihydroxy, dimethylterephthalamide in methylene chloride (or diethyl ether). The solvent is removed using reduced pressure and the chelate remains hydrophobically bound on the inner surface of the bottle. When the bottle is contacted with an 0.01M aqueous solution of Fe(III), the free Fe(III) in solution is significantly reduced after 1 hr of agitation.

EXAMPLE 9

| Tablet Formation | |
|---|---|
| Ingredients | Quantity per Tablet, mgs. |
| Active Ingredient (Structure I) | 350 |
| Cornstarch | 20 |
| Lactose. spray dried | 100 |
| Mangesium stearate | 2 |

The above ingredients are throughly mixed, granulated and pressed into single scored tablets.

EXAMPLE 10

| Capsule Formation | |
|---|---|
| Ingredients | Quantity per Tablet, mgs. |
| Active Ingredient (Structure I) | 350 |
| Lactose, spray dried | 100 |
| Mangesium stearate | 2 |

While only a few embodiments of the invention have been shown and described herein, it will become apparent to those skilled in the art that various modifications and changes can be made in the process to remove metal ions from aqueous solution using monomeric 2,3-dihydroxyterephthalamides without departing from the spirit and scope of the present invention. All such modifications and changes coming within the scope of the appended claims are intended to be carried out thereby.

We claim:

1. A process for the removal of metal ions from an aqueous solution, which process comprises:

(a) contacting the metal ion-contacting aqueous solution with a sufficient quantity of a 2,3-dihydroxy-diterephthalamide of the structure (I):

wherein:
A is selected from hydrogen or a linking-carrier group Y-Q, wherein Y is a linking group selected from alkylene, arylene, or arylalkylene covalently linked to the chelate and also to carrier Q, wherein carrier Q is selected from a higher molecular weight water soluble or water insoluble polymer having a molecular weight of between about 500 and 1,000,000 daltons, $R_1$ is independently selected from alkyl having from 1 to 20 carbon atoms or aryl having from 6 to 14 carbon atoms, $R_2$ is selected from $R_1$ or an organic linking group Z selected from alkylene, arylene, or aryl to a solid substrate, with the proviso that the structure will have only one linking group selected from Y or Z to a carrier Q to form a two ligand or three ligand bidentate chelate of the metal (M) ion; and (b) separating the metal ion two ligand or three ligand bidentate chelate thus formed from the aqueous solution.

2. The process of claim 1 wherein in structure (I), A is hydrogen and $R_1$ and $R_2$ are each selected from higher alkyl or aryl such that the two ligand or three ligand bidentate chelate.metal is substantially soluble in organic solvents, and
in step (b) the two ligand or three ligand bidentate chelate metal is removed by extraction using an organic solvent which is essentially insoluble in water.

3. The process of claim 1 wherein A is Y-Q wherein Y is a linking group bonded to carrier Q; and
in step (a), the aqueous solution containing the metal ion is brought in contact with the chelating agent linked to carrier Q which chelates the metal ion, and
the aqueous solution and the chelating agent linked to carrier Q are subsequently physically separated.

4. The process of claim 1 wherein A is hydrogen, and $R_1$ is selected from higher alkyl or aryl; and
in step (a) the two ligand or three ligand bidentate metal chelate in aqueous solution is contacted under effective pressure and effective temperature with a porous selective membrane, such that
in step (b) the two ligand or three ligand bidentate.-metal.chelate is selectively retained whereas the water and chemical species present of molecular weight less than about 300 daltons are separated by membrane separation means.

5. The process of claim 4 wherein the membrane separation means are selected from a dialysis membrane or an ultrafiltration membrane.

6. The process of claim 1 wherein an effective amount of the phthalamide to reduce the metal ion content in aqueous solution is present at a level of between about $10^{-3}$ M and $10^{-6}$ M.

7. The process of claim 1 wherein in the phthalamide of structure I A is hydrogen and $R_1$ and $R_2$ are each independently selected from methyl, ethyl, i-propyl, or normal-propyl.

8. The process of claim 7 wherein in step (a) an effective amount of the phtalamide of structure I is present at a level of between about $10^{-3}$M to $10^{-6}$M.

9. The process of claim 7 wherein the aqeuous solution of step (a) is selected from wine, beer, foods, industrial waste water, municipal water supplies, industrial process water, mine drainage, human plasma in vivo, human plasma in vitro, human blood in vivo, or human blood in vitro.

10. The process of claim 1 wherein in step (a), the aqueous solution is selected from wine, beer, food, industrial waste water, municipal supplies, industrial process water, mine drainage, human plasma in vivo, human plasma in vitro, human blood in vivo, or human blood in vitro.

11. The process of claim 1 wherein in the phthalamide of structure (I), $R_1$ and $R_2$ are each independently aryl.

12. The process of claim 1 wherein in the phthalamide of structure (I), $R_1$ and $R_2$ are each independently alkyl having from 1 to 6 carbon atoms.

13. The process of claim 1 wherein in step (a) the metal (M) ion is independently selected from the lanthanide metals, the actinide metals, the transition metals or mixtures of these metal ions.

14. The process of claim 1 wherein the metal (M) ion is selected from iron (III), copper (II), cobalt (II), nickel (II), zinc (II), chromium (III), cadmium (II), or mixtures of these ions.

15. The process of claim 1 wherein in the phthalamide of structure I, A is hydrogen, and $R_1$ and $R_2$ are each independently alkyl having from 1 to 6 carbon atoms.

16. The process of claim 15 wherein $R_1$ and $R_2$ are each independently selected from methyl, ethyl, propyl, butyl, octyl or decyl.

17. The process of claim 16 wherein A is hydrogen and $R_1$ and $R_2$ are each methyl.

18. The process of claim 16 wherein A is hdyrogen and $R_1$ and $R_2$ are each ethyl.

19. The process of claim 16 wherein A is hydrogen and $R_1$ and $R_2$ are each propyl.

20. The process of claim 16 wherein A is hydrogen and $R_1$ and $R_2$ are each butyl.

21. The process of claim 16 wherein in step (a), the at least one metal ion in aqueous solution is selected from the lanthanide metals, the actinide metals, the transition metals, or mixtures of these metal ions.

22. The process of claim 16 wherein, in step (a) the metal (M) ion is selected from iron (III), copper (II), cobalt (II), nickel (II), magnesium (II), zinc (II), chromium (III), cadmium (III), or mixtures of these metal ions.

23. The process of claim 22 wherein the metal ion removed is iron (III).

24. The process of claim 16 wherein the aqueous solution is selected from human blood in vivo human blood in vitro.

25. The process of claim 24 wherein the metal ion present in the aqueous solution in step (a) is selected from iron (III), copper (II), cobalt (II), nickel (II), magnesium (II), zinc (II), chromium (III), cadmium (II), or mixtures thereof.

26. The process of claim 25 wherein the metal ion is iron (III).

* * * * *